United States Patent [19]

Yamanaka et al.

[11] Patent Number: 5,670,225
[45] Date of Patent: Sep. 23, 1997

[54] UNIAXIALLY STRETCHED MULTILAYERED FILM AND AIR BAGGAGE TAG CONTAINING THE SAME

[75] Inventors: Masaaki Yamanaka; Masaki Shiina, both of Ibaraki, Japan

[73] Assignee: Oji-Yuka Synthetic Paper Co., Ltd., Tokyo, Japan

[21] Appl. No.: 561,464

[22] Filed: Nov. 21, 1995

[30] Foreign Application Priority Data

Dec. 8, 1994 [JP] Japan ................... 6-330435

[51] Int. Cl.⁶ ................... B42D 15/00
[52] U.S. Cl. ................... 428/40.1; 40/665; 428/41.3; 428/41.7; 428/315.5; 428/315.7; 428/315.9; 428/354; 428/910; 524/483; 525/179; 525/180; 525/189; 525/240; 525/436; 525/537
[58] Field of Search ................... 428/40.1, 41.3, 428/910, 354, 41.7, 315.5, 315.9; 40/665; 525/179, 180, 189, 436, 537, 240; 524/483

[56] References Cited

U.S. PATENT DOCUMENTS 4,986,866  1/1991  Ohba ................... 428/910
5,318,817  6/1994  Ohno ................... 428/41.3

FOREIGN PATENT DOCUMENTS 0552656  7/1993  European Pat. Off. .

*Primary Examiner*—Nasser Ahmad
*Attorney, Agent, or Firm*—Sughrue, Mion, Zinn, Macpeak & Seas

[57] ABSTRACT

A uniaxially stretched multilayered film obtained by uniaxially stretching a laminated film at a stretch ratio of from 3 to 10 to form many closed fine voids in each layer, said laminated film comprising a base layer (A) made of a resin composition comprising resinous ingredients comprising from 50 to 90% by weight crystalline polyolefin (a) and from 50 to 10% by weight thermoplastic resin (b) having a lower melting point than the crystalline polyolefin (a) and an inorganic fine powder (c) in an amount of from 0 to 35% by weight based on the sum of the weight of the resinous ingredients and, formed on at least one side of said base layer (A), a surface layer (B) made of a resin composition comprising from 20 to 80% by weight inorganic fine powder (d) and from 80 to 20% by weight crystalline polyolefin (e), said uniaxially stretching being conducted at a temperature lower than the melting point of said crystalline polyolefin (a) and lower than the melting point of said crystalline polyolefin (e) but at a temperature higher than the melting point of said thermoplastic resin (b).

7 Claims, 3 Drawing Sheets

– 1 –

UNIAXIALLY STRETCHED MULTILAYERED FILM AND AIR BAGGAGE TAG CONTAINING THE SAME

FIELD OF THE INVENTION

The present invention relates to a uniaxially stretched multilayered film (synthetic paper) having excellent tear resistance and printability and an air baggage tag containing the same.

BACKGROUND OF THE INVENTION

Synthetic papers composed of a biaxially stretched base film layer laminated on both sides with a surface layer which is a uniaxially stretched film of a thermoplastic resin containing an inorganic fine powder (see U.S. Pat. Nos. 4,075,050 and 4,318,950, JP-B-46-40794 and JP-B-54-31032; the term "JP-B" as used herein means an "examined Japanese patent publication") have conventionally been used in applications such as art paper, heat-sensitive recording paper, shopping bags, recording paper for heat transfer recording, standing signboards, etc., because such synthetic papers are lightweight and have excellent printability due to the presence of many fine voids (empty spaces) therein.

On the other hand, checked air baggage is managed by the airline by attaching to each piece of baggage a tag bearing printed information including the name or mark of the airline, destination of the baggage, transit point, baggage tag number, flight number, etc.

Various baggage management systems are known as proposed in, e.g., JP-A-50-50896 (the term "JP-A" as used herein means an "unexamined published Japanese patent application"), JP-A-U-60-19073 (the term "JP-A-U" as used herein means an "unexamined published Japanese utility model application"), JP-A-U-63-192075, JP-A-U-62-53481, JP-A-U-62-123681 and JP-A-U-1-231083.

With the recent rapid increase in the number of air travelers, accuracy and speediness in baggage management in airports have come to be strongly demanded. To cope with this demand, a baggage management system based on bar code recording (by heat-sensitive recording, heat transfer recording, laser printing, etc.) and readout is coming into common use.

Use of a waterproof, synthetic or coated paper in such baggage tags is known (see JP-B-U-2-45893; the term "JP-B-U" as used herein means an "examined Japanese utility model publication"), and these baggage tags have already been put to practical use.

Air baggage tags based on a synthetic paper which comprises a stretched film of a thermoplastic resin containing an inorganic fine powder and which has many fine voids are lightweight due to the presence of these fine voids and have excellent printability due to the rough surface layer on which many cracks are present. These baggage tags also have better strength than those based on a coated paper.

However, since a large amount of baggage including trunks, suitcases, and souvenir boxes must be transported and managed by an airline in a limited time period, it often happens that workers carelessly pull a piece of baggage by its tag in baggage handling. Use of a long and narrow tag based on a synthetic paper having the aforementioned structure comprising a uniaxially stretched film/biaxially stretched film/uniaxially stretched film unit has a drawback in that when this tag is handled in the above-described manner, even an initial small scratch readily propagates to cause the whole tag to be torn apart from the baggage.

An air baggage tag having improved tear strength has been proposed which comprises the same synthetic paper as described above and a uniaxially stretched sheet with higher tear resistance bonded to the back side of the synthetic paper in such a manner that the direction of stretching for the sheet is perpendicular to the direction of higher stretching for the synthetic paper (see JP-A-5-286081). Although improved in tear strength, this prior art baggage tag has drawbacks in that processing troubles arise, such as generation of rumples during bonding, and that the necessity of a bonding step heightens the cost of the air baggage tag.

SUMMARY OF THE INVENTION

An object of the present invention is to provide a synthetic paper which is excellent in printability and tear resistance and which is produced without a bonding operation. Another object of the present invention is to provide an air baggage tag containing such synthetic paper.

According to a first aspect of the present invention, a uniaxially stretched multilayered film is provided which is obtained by uniaxially stretching a laminated film at a stretch ratio of from 3 to 10, said laminated film comprising a base layer (A) made of a resin composition comprising resinous ingredients comprising from 50 to 90% by weight crystalline polyolefin (a) and from 50 to 10% by weight thermoplastic resin (b) having a lower melting point than the crystalline polyolefin (a) and an inorganic fine powder (c) in an amount of from 0 to 35% by weight based on the sum of the weight of the resinous ingredients and, formed on at least one side of said base layer (A), a surface layer (B) made of a resin composition comprising from 20 to 80% by weight inorganic fine powder (d) and from 80 to 20% by weight crystalline polyolefin (e), said uniaxially stretching being conducted at a temperature lower than the melting point of said crystalline polyolefin (a) and lower than the melting point of said crystalline polyolefin (e) but at a temperature higher than the melting point of said thermoplastic resin (b).

According to a second aspect of the present invention, an air baggage tag is provided which comprises a recording layer (II) bearing a bar code, a substrate layer (i), a self-adhesive layer (III), and a release paper layer (IV), which air baggage tag is managed by means of the bar code, said substrate layer (I) being the uniaxially stretched multilayered film as described above which has a void volume of from 10 to 60% and an Elmendorf tear strength ((ASTM D-1922-61T) JIS P-8116) of from 15 g to 80 g as measured in the direction of stretching and an Elmendorf tear strength of from 100 g to 600 g as measured in a direction perpendicular to the stretching direction (in the transverse direction).

Figure 1:
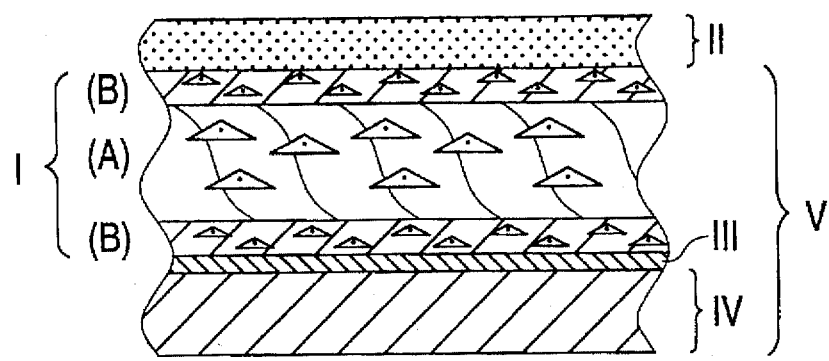
FIG. 1 is a sectional view of one embodiment of the air baggage tag of the present invention.

Major symbols in the Figures have the following meaning:

I substrate layer
A base layer
B surface layer
II recording layer
III self-adhesive layer
IV release paper layer
V base layer of air baggage tag
1 air baggage tag
2 bar code
3 baggage tag
4 trace tag
5 claim tag
6 perforations
7 cut
8 trunk Other symbols used in the Figures are later described.

DETAILED DESCRIPTION OF THE INVENTION

Due to the base layer which is a film containing a low-melting thermoplastic resin (b) and which has been uniaxially stretched in the machine direction, a tearing force applied to the uniaxially stretched multilayered film in a direction perpendicular to the stretching direction (in the transverse direction) does not propagate in the transverse direction because of the non-orientation of the base layer in the transverse direction. Thus, high tear resistance is imparted to the uniaxially stretched multilayered film.

Furthermore, since the surface layer of the multilayered film is a uniaxially stretched resin film containing an inorganic fine powder, the multilayered film has excellent suitability for offset printing and gravure printing.

(I) Uniaxially Stretched Multilayered Film

The uniaxially stretched multilayered film provided in the first aspect of the present invention is obtained from a laminated film comprising a base layer (A) made of a resin composition comprising resinous ingredients comprising from 50 to 90% by weight crystalline polyolefin (a) and from 50 to 10% by weight thermoplastic resin (b) having a lower melting point than the crystalline polyolefin (a) and an inorganic fine powder (c) in an amount of from 0 to 35% by weight based on the sum of the weight of the resinous ingredients and, formed on at least one side of the base layer (A), a surface layer (B) made of a resin composition comprising from 20 to 80% by weight inorganic fine powder (d) and from 80 to 20% by weight crystalline polyolefin (e), by uniaxially stretching the laminated film at a temperature lower than the melting point of the crystalline polyolefin (a) and lower than the melting point of the crystalline polyolefin (e) but at a temperature higher than the melting point of the thermoplastic resin (b) at a stretch ratio of from 3 to 10 to form many closed fine voids around the inorganic fine powders in each layer.

(i) Base Layer (A)

Crystalline polyolefin (a) for use in base layer (A) in the uniaxially stretched multilayered film has a degree of crystallinity of from 20 to 75%, preferably from 30 to 70%. Examples thereof include homopolymers of α-olefins having 2 to 8 carbon atoms, e.g., ethylene, propylene, butene-1, hexene-1, octene-1, heptene-1, 4-methylpentene-1, and 3-methylpentene-1, and copolymers of two or more of these α-olefins.

Specific examples of crystalline polyolefin (a) include high density polyethylene having a density of from 0.950 to 0.970 g/cm$^3$, propylene homopolymer ethylene/propylene copolymers, propylene/butene-1 copolymers, poly(4-methylpentene-1), propylene/ethylene/butene-1 terpolymers, and propylene/3-methylpentene-1 copolymers.

Especially preferred of these are propylene homopolymer and poly(4-methylpentene-1) each of which has a melting point (peak temperature in a DSC curve) of from 160° to 180° C. and a melt flow rate (230° C., 2.16-kg load) of from 0.5 to 20 g/10 min.

Examples of thermoplastic resin (b), which has a melting point lower than that of crystalline polyolefin (a) (preferably by 35° to 60° C.), usually having a melting point of from 60° to 160° C., and a melt flow rate (190° C., 2.16-kg load) of from 2 to 150 g/10 min., include homopolymers of α-olefins and copolymers of a major proportion of an ethylene and a minor proportion of one or more other α-olefins, such as high pressure process low density polyethylene having a density of from 0.860 to 0.940 g/cm$^3$, ethylene/propylene copolymers ethylene/butene-1 copolymers, ethylene/pentene-1 copolymers, ethylene/hexene-1 copolymers, ethylene/octene-1 copolymers, ethylene/3-methylbutene copolymers, ethylene/3-methylpentene-1 copolymers, ethylene/4-methylpentene-1 copolymers, ethylene/3-methylhexene-1 copolymers, and ethylene/4-methylhexene-1 copolymers, copolymers of ethylene and one or more other vinyl monomers, such as ethylene/vinyl acetate copolymers, ethylene/alkyl acrylate copolymers, and ethylene/acrylic acid copolymers and metal (Na, K, Li, Al, Zn) salts thereof (Surlyn), polybutene-1, and petroleum resins.

Preferred of these are low-density polyethylene, ethylene/vinyl acetate copolymers, ethylene/alkyl acrylate copolymers (the alkyl group has 1 to 4 carbon atoms), and Surlyn, each of which has a melting point of from 80° to 128° C.

Crystalline polyolefin (a) is blended with thermoplastic resin (b), having a lower melting point than polyolefin (a), in such an amount that the proportion of polyolefin (a) is from 50 to 90% by weight, preferably from 60 to 80% by weight, and that of resin (b) is from 50 to 10% by weight, preferably from 40 to 20% by weight (basis: total weight of polyolefin (a)+resin (b)).

If the proportion of resin (b) is smaller than 10% by weight, no improvement in tear resistance is attained. If the proportion thereof exceeds 50% by weight, rigidity becomes insufficient, resulting in the necessity of increasing the thickness of the uniaxially stretched multilayered film.

Examples of the inorganic fine powder include calcium carbonate, calcined clay, diatomaceous earth, talc, titanium oxide, barium sulfate, aluminum sulfate, and silica each having an average particle diameter of from 0.03 to 10 μm, preferably from 0.1 to 4 μm.

(ii) Surface Layer (B)

The inorganic fine powder contained in the surface layer may be any of the inorganic fine powders enumerated above with regard to base layer (A) having the average particle diameter earlier given. The inorganic fine powder contained in the surface layer and that contained in the base layer may be of the same kind or differ from each other.

Examples of crystalline polyolefin (e) contained in the surface layer include the same polyolefins having the same properties enumerated with regard to crystalline polyolefin (a) in base layer (A). Preferred from the standpoint of cost are propylene homopolymer and high density polyethylene having a density of 0.950 to 0.970 g/cm$^3$.

If the content of the inorganic fine powder in surface layer (B) is lower than 20% by weight, printability and suitability for writing with a pencil are impaired. In an air baggage tag having a recording layer, such a surface layer results in poor printability (adhesion) of printed matter to the recording layer.

On the other hand, if the content thereof exceeds 80% by weight, dispersion of the powder into the film matrix becomes poor, resulting in impaired stretchability.

The uniaxially stretched multilayered film can be produced, for example, by the following method.

A resin composition for forming base layer (A) and a resin composition for forming surface layer (B) are melt-kneaded by means of separate extruders. The resulting melts are fed to the same co-extrusion die, laminated to each other within the die, and extruded into a sheet form. The extrudate is first cooled to 10° to 60° C. and then reheated to a temperature lower by 3° to 40° C. than the melting point of crystalline polyolefins (a) and (e) and higher than the melting point of thermoplastic resin (b), preferably by from 10° to 35° C. The extrudate is stretched at that temperature in the machine direction at a stretch ratio of 3 to 10 by means of a circumferential speed difference between rolls to thereby obtain the desired film.

If desired, the stretched film is subjected to an annealing treatment and a corona discharge treatment.

The uniaxially stretched multilayered film thus obtained has many fine voids. The void volume thereof as calculated using the following equation is preferably from 10 to 60%, more preferably from 20 to 45%.

$$\text{Void volume (\%)} = \frac{(\text{Density of unstretched film}) - (\text{Density of stretched film})}{(\text{Density of unstretched film})} \times 100$$

In this uniaxially stretched multilayered film, the thickness of base layer (A) is preferably from 20 to 300 μm, more preferably from 30 to 150 μm, and that of surface layer (B) is preferably from 1 to 100 μm, more preferably from 2 to 50 μm, with the total thickness thereof being preferably from 30 to 400 μm, more preferably from 50 to 120 μm, from the standpoint of cost.

For use as substrate (I) in the air baggage tag, the uniaxially stretched multilayered film has Elmendorf tear strengths (ASTM D-1922-61T) of 15 g or higher, preferably from 20 to 80 g, as measured in the direction of stretching and of 100 g or higher, preferably from 150 to 600 g, as measured in a direction perpendicular to the stretching direction (in the transverse direction).

Air Baggage Tag

The air baggage tag comprises a recording layer (II) bearing a bar code (see FIG. 2), a substrate layer (I), a pressure-sensitive-adhesive layer (III), and a release paper layer (IV) and is managed by means of the bar code, wherein the substrate layer (I) is the uniaxially stretched multilayered film as earlier described which has a void volume of from 10 to 60% and Elmendorf tear strengths (ASTM D-1922-61T) of 15 g or higher as measured in the direction of stretching and of 100 g or higher as measured in the transverse direction.

Substrate Layer (I)

The uniaxially stretched multilayered film described above is used as substrate layer (I).

Recording Layer (II)

Recording layer (II) to be superposed on surface layer (B) of the above-described substrate layer (I) can be formed by applying a coating composition capable of providing any of a heat-sensitive color-developable recording layer, a coating layer for laser printing, and a heat transfer image-receiving layer, on each of which a bar code can be printed. The thickness of the coating composition layers are from 0.2 to 30 μm.

i) Heat-Sensitive Recording Layer

The heat-sensitive recording layer is formed by coating a coating composition containing a color former and a color developer in a dispersion medium, followed by drying.

Examples of the color former and color developer for use in the heat-sensitive recording layer are given below. Any combination of a color former and a color developer is usable as long as the two ingredients undergo a color formation reaction on contact with each other. For example, use can be made of a combination of a colorless to light-colored basic dye and an inorganic or organic acidic substance, a combination of a higher fatty acid metal salt, e.g., ferric stearate, and a phenol, e.g., gallic acid, and a combination of a diazonium compound, a coupler, and a basic substance.

(a) Color Former

The colorless to light-colored basic dye to be incorporated as a color former into the heat-sensitive recording layer may be selected from various known compounds. Examples thereof include triarylmethane dyes, e.g., 3,3-bis(p-dimethylaminophenyl)-6-dimethylaminophthalide, 3,3-bis (p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazoyl-3-yl)-6-dimethylaminophthalide, 3,3-bis(2-phenylindol-3-yl)-6-dimethylaminophthalide, and 3-p-dimethylaminophenyl-3-(1-methylpyrrol-3-yl)-6-dimethylaminophthalide; diphenylmethane dyes, e.g., 4,4'-bisdimethylaminobenzhydryl benzyl ether, an N-halophenylleucoauramine, and N-2,4,5-trichlorophenylleucoauramine; thiazine dyes, e.g., benzoyl Leucomethylene Blue and p-nitrobenzoyl Leucomethylene Blue; spiro dyes, e.g., 3-methyl-spiro-dinaphthopyran, 3-ethyl-spiro-dinaphthopyran, 3-phenyl-spiro-dinaphthopyran, 3-benzyl-spiro-dinaphthopyran, 3-methylnaphtho-(6'-methoxybenzo)spiropyran, and 3-propyl-spiro-dibenzopyran; lactam dyes, e.g., Rhodamine B anilinolactam, Rhodamine (p-nitroanilino)lactam, and Rhodamine (o-chloroanilino)lactam; and fluoran dyes, e.g., 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-p-toluidino)-7-methylfluoran, 3-diethylamino-7-N-acetyl-N-methylaminofluoran, 3-diethylamino-7-N-methylaminofluoran, 3-diethylamino-7-dibenzylaminofluoran, 3-diethylamino-7-N-methyl-N-benzylaminofluoran, 3-diethylamino-7-N-chloroethyl-N-methylaminofluoran, 3-diethylamino-7-N-dimethylaminofluoran, 3-(N-ethyl-p-toluidino)-6-methyl-7-phenylaminofluoran, 3-(N-cyclopentyl-N-ethylamino)-6-methyl-7-anilinofluoran, 3-(N-ethyl-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-ethyl-N-isoamylamino)-6-methyl-7-phenylaminofluoran, 3-(N-cyclohexyl-N-methylamino)-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)fluoran, 3-dibutylamino-7-(o-chlorophenylamino)fluoran, 3-pyrrolidino-6-methyl-7-p-butylphenylaminofluoran, 3-N-methyl-N-tetrahydrofurfurylamino-6-methyl-7-anilinofluoran, and 3-N-ethyl-N-tetrahydrofurfurylamino-6-methyl-7-anilinofluoran.

(b) Color Developer

The inorganic or organic acidic substance which forms a color on contact with the basic dye may be selected from various known compounds. Examples thereof include inorganic acidic substances such as active clay, acid clay, attapulgite, bentonite, colloidal silica, and aluminum silicate; and organic acidic substances such as phenol compounds, e.g., 4-t-butylphenol, 4-hydroxydiphenoxide, α-naphthol, β-naphthol, 4-hydroxyacetophenol, 4-t-octylcatechol, 2,2'-dihydroxydiphenol, 2,2'-methylenebis(4-methyl-6-t-isobutylphenol), 4,4'-isopropylidenebis(2-t-butylphenol), 4,4'-sec-butylidenediphenol, 4-phenylphenol, 4,4'-isopropylidenediphenol (bisphenol A), 2,2'-methylenebis(4-chlorophenol), hydroquinone, 4,4'-cyclohexylidenediphenol, benzyl 4-hydroxybenzoate, dimethyl 4-hydroxyphthalate, hydroquinone monobenzyl ether, novolak phenol resins, and phenolic polymers, aromatic carboxylic acids, e.g., benzoic acid, p-t-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-t-butylsalicylic acid, 3-benzylsalicylic acid, 3-(α-methylbenzyl)salicylic acid, 3-chloro-5-(α-methylbenzyl)salicylic acid, 3,5-di-t-butylsalicylic acid, 3-phenyl-5-(α,α-dimethylbenzyl) salicylic acid, and 3,5-di-α-methylbenzylsalicylic acid, and salts of the above-enumerated phenol compounds or aromatic carboxylic acids with polyvalent metals, e.g., zinc, magnesium, aluminum, calcium, titanium, manganese, tin, and nickel.

(c) Amount Ratio

If desired, these basic dyes (color formers) or color developers may be used in combination of two or more thereof. The proportion of the basic dye to the color developer is not particularly limited, and is suitably selected according to the kinds of the basic dye and color developer used. In general, however, the color developer is used in an amount of about from 1 to 20 parts by weight, preferably about from 2 to 10 parts by weight, per 1 part by weight of the basic dye.

(d) Coating Composition

A coating composition containing the above-described ingredients is prepared, for example, by dispersing the dye (color former) and the color developer simultaneously or separately into a dispersion medium, usually water, by means of a stirring and grinding machine, such as a ball mill, attritor, or sand mill.

The coating composition further contains a binder in an amount of about from 2 to 40% by weight, preferably about from 5 to 25% by weight, based on the total amount (weight) of all solid components. Examples of the binder include starch and derivatives thereof, hydroxyethyl cellulose, methyl cellulose, carboxymethyl cellulose, gelatin, casein, gumarabic, polyvinyl alcohol, acetoacetyl-modified polyvinyl alcohol, diisobutylene/maleic anhydride copolymer salts (Na, Li, K, ammonium), styrene/maleic anhydride copolymer salts (Na, K, Li, ammonium), ethylene/acrylic acid copolymer salts, styrene/butadiene copolymer emulsions, urea resins, melamine resins, amide resins, and amino resins.

(e) Other Additives

If desired, the coating composition may suitably contain various additives. Usable additives include dispersing agents, e.g., sodium dioctylsulfosuccinate, sodium dodecylbenzenesulfonate, sodium lauryl sulfate, and fatty acid metal salts (Na, Zn, Al), ultraviolet absorbents, e.g., benzophenone compounds, defoaming agents, fluorescent dyes, colored dyes, and electrically conductive substances.

If desired, the composition may furthermore contain zinc stearate, calcium stearate, waxes, e.g., polyethylene wax, carnauba wax, paraffin wax, and ester waxes, fatty acid amides, e.g., stearamide, methylenebisstearamide, oleamide, palmitamide, and coconut oil fatty acid amide, hindered phenols, e.g., 2,2'-methylenebis(4-methyl-6-t-butylphenol) and 1,1,3-tris(2-methyl-4-hydroxy-5-t-butylphenyl)butane, ultraviolet absorbents, e.g., 2-(2'-hydroxy-5'-methylphenyl) benzotriazole and 2-hydroxy-4-benzyloxybenzophenone, esters, e.g., 1,2-di(3-methylphenoxy)ethane, 1,2-diphenoxyethane, 1-phenoxy-2-(4-methylphenoxy)ethane, dimethyl terephthalate, dibutyl terephthalate, dibenzyl terephthalate, p-benzylbiphenyl, 1,4-dimethoxynaphthalene, 1,4-diethoxynaphthalene, and phenyl 1-hydroxynaphthoate, various known thermoplastic substances, and inorganic pigments, e.g., kaolin, clay, talc, calcium carbonate, calcined clay, titanium oxide, diatomaceous earth, finely ground anhydrous silica, and active clay.

ii) Heat Transfer Image-Receiving Layer

The heat transfer image-receiving layer is an image-receiving layer which, when brought into contact with a heat transfer sheet and heated, is capable of receiving an ink transferred from the heat transfer sheet to form an image.

Such an image-receiving layer is formed by applying a coating composition for image-receiving layer formation and drying the coating to evaporate the solvent present.

Examples of the resin contained in such a coating composition for image-receiving layer formation include oligoester acrylate resins, saturated polyester resins, vinyl chloride/vinyl acetate copolymers, acrylic ester/styrene copolymers, and epoxy acrylate resins. The coating composition is prepared by dissolving such a resin in, e.g., toluene, xylene, methyl ethyl ketone, or cyclohexanone.

The coating composition may contain an ultraviolet absorbent and/or a light stabilizer so as to have increased light resistance.

Ultraviolet Absorbent

Examples of the ultraviolet absorbent include 2-(2'-hydroxy-3,3'-di-t-butylphenyl)-5-chlorobenzotriazole, 2-(2-hydroxy-3,5-t-amylphenyl)-2H-benzotriazole, 2-(2'-hydroxy-3'-t-butyl-5'-methylphenyl)-5-chlorobenzotriazole, 2-(2'-hydroxy-3',5'-t-butylphenyl)benzotriazole, and 2-(2'-hydroxy-3',5'-di-t-amylphenyl)benzotriazole.

Light Stabilizer

Examples of the light stabilizer include distearylpentaerythritol diphosphite, bis(2,4-di-t-butylphenyl) pentaerythritol diphosphite, dinonylphenylpentaerythritol diphosphite, cyclic neopentanetetraylbis(octadecyl phosphite), tris(nonylphenyl) phosphite, and 1-[2-[3-(3,5-di-t-butyl-4-hydroxyphenyl]propionyloxy]-2,2,6,6-tetramethylpiperidine.

The ultraviolet absorbent and light stabilizer each is added in an amount of from 0.05 to 10 parts by weight, preferably from 0.5 to 3 parts by weight, per 100 parts by weight of the resin constituting the image-receiving layer.

Other Additives

In order to improve releasability from the heat transfer sheet after heat transfer, a release agent may be incorporated in the image-receiving layer. Examples of the release agent include solid waxes, e.g., polyethylene wax, amide waxes, and Teflon powder, fluorine containing surfactants or phosphoric ester surfactants, and silicone oils, with silicone oils being preferred. The silicone oils may be oily, but are preferably hardened oils.

A white pigment may be added to the image-receiving layer for the purposes of increasing the whiteness of the image-receiving layer to thereby improve the sharpness of the transferred image, of imparting pencil writability to the surface of the heat transfer image-receiving layer, and of preventing re-transfer of the transferred image. Examples of the white pigment include titanium oxide, zinc oxide, and kaolin clay. These pigments may be used as a mixture of two or more thereof.

The titanium oxide for use in the image-receiving layer may be either anatase or rutile. Examples of the anatase titanium oxide include KA-10, KA-20, KA-15, KA-30, KA-35, KA-60, KA-80, and KA-90 (all manufactured by Titan Kogyo K.K.). Examples of the rutile titanium oxide include KR-310, KR-380, KR-460, and KR-480 (all manufactured by Titan Kogyo K.K.). The white pigment is added in an amount of from 5 to 90 parts by weight, preferably from 30 to 80 parts by weight, per 100 parts by weight of the resin constituting the image-receiving layer.

The heat transfer image-receiving layer has a thickness of usually from 0.2 to 20 μm, preferably from 3 to 15 μm.

Heat Transfer Sheet

Various heat transfer sheets may be used for transferring an ink to the heat transfer image-receiving layer to form an image. Specifically, the heat transfer sheet is composed of a substrate, e.g., a polyester film, having formed thereon a coating layer of a composition which comprises a binder and a colorant as major components and optionally contains additives such as a softening agent, plasticizer, melting point regulator, smoothing agent, and dispersing agent.

Examples of those major components are as follows. Useful binders include well-known waxes, e.g., paraffin wax, carnauba wax, and ester waxes, and various low melting point polymers. Useful colorants include carbon black, various organic or inorganic pigments, and various dyes. Sublimation type inks are also usable.

iii) Coating Layer for Laser Printing (a) Coating Composition for Laser-Printable Coating Layer For forming the coating layer for laser printing on surface layer (B) in substrate layer (I), a coating composition basically comprising 80 to 40% by weight acrylurethane resin and 20 to 60% by weight filler is used.

Specifically, the coating composition for forming a laser-printable coating layer comprises an acrylic or methacrylic acid (hereinafter inclusively referred to as (meth)acrylic acid) ester polymer which has been crosslinked by urethane linkages as a matrix and a filler dispersed therein.

Acrylurethane Resin

The acrylurethane resin described above is known, as described, e.g., in JP-B-53-32386 and JP-B-52-73985.

Such an acrylurethane resin is generally obtained by reacting a urethane prepolymer obtained from a polyisocyanate and a polyhydric alcohol with a hydroxymono(meth)acrylate. Polymerizing the ethylenic linkages of this acrylurethane resin gives the (meth)acrylic ester polymer crosslinked by urethane linkages.

The (meth)acrylic ester polymer is a homo- or copolymer of a (meth)acrylic ester in which the alcohol moiety has one to four hydroxyl group and preferably one hydroxyl group.

This hydroxylated polymer has a hydroxyl number of from 20 to 200, preferably from 60 to 130. The terminology "hydroxyl number" means the number of milligrams of potassium hydroxide necessary to neutralize the acetic acid linked to hydroxyl groups of a one-g sample of the polymer, when acetylating the polymer.

The (meth)acrylic ester providing such a polymer is a monoester of an alcoholic compound containing at least two (and preferably two) hydroxyl groups per molecule. The terminology "alcoholic compound" as used herein includes polyoxyalkylene glycols (the alkylene contains about 2 or 3 carbon atoms) as well as typical alkanols. Specific examples of such (meth)acrylic esters include 2-hydroxyethyl (meth)acrylate, 2-hydroxypropyl (meth)acrylate, di- or polyethylene glycol mono(meth)acrylate, and glycerin mono(meth)acrylate.

From the standpoint of a balance among hardness, toughness, and elasticity of the coating composition after hardening, the (meth)acrylic ester polymer is preferably a copolymer. There are various monomers copolymerizable with the above-mentioned (meth)acrylic esters, and any desired comonomers appropriate for the particular purpose may be used. Examples of usable comonomers include alkyl (meth)acrylates (the alkyl group has 1 to 6 carbon atoms), cyclohexyl (meth)acrylate, styrene, vinyltoluene, and vinyl acetate. Instead of producing the copolymer by copolymerizing a hydroxylated (meth)acrylic ester, the desired copolymer may be obtained by subjecting a polymer containing a hydroxyl group. Polymerization is advantageously carried out by solution polymerization.

Examples of the polyisocyanate for forming a urethane linkage unit include 2,6-tolylene diisocyanate, 2,4-tolylene diisocyanate, xylylene diisocyanate, diphenylmethane diisocyanate, 1,6-hexamethylene diisocyanate, and compounds obtained from derivatives thereof and containing two or more isocyanate groups per molecule.

A part of the (meth)acrylic ester polymer crosslinked by urethane linkages, i.e., the acrylurethane resin constituting a matrix, may be replaced with a vinyl chloride/vinyl acetate copolymer.

Filler

Examples of the filler for use in the coating composition for a laser printable coating layer include those used in conventional coating compositions, such as heavy calcium carbonate, calcined clay, titanium oxide, barium sulfate, and diatomaceous earth.

(b) Application Amount

The coating composition is applied in an amount of usually from 0.5 to 20 g/m$^2$, preferably from 2 to 8 g/m$^2$, in terms of solid amount after drying.

Formation of Recording Layer

Recording layer (II) to be superposed on surface layer (B) of substrate layer (I) described hereinabove can be formed by applying any of the coating composition giving a thermally color-developable recording layer on which a bar code can be formed, the coating composition giving a heat transfer image-receiving layer which, when brought into contact with a heat transfer sheet and heated, is capable of receiving an ink transferred from the heat transfer sheet to yield a bar code, and the coating composition giving a laser-printable coating layer on which a bar code can be formed by laser printing.

Application

The coating composition for forming a heat-sensitive recording layer containing a color former and a color developer, the coating composition for forming a heat transfer image-receiving layer, or the coating composition for forming a laser-printable coating layer is generally applied with a brush, roller, pad, spray gun, etc., or by dipping, and the coating is dried at a temperature high enough for volatilization or evaporation of the solvent used.

For example, in the case of roller coating, the application of a solvent solution type coating composition to surface layer (B) of uniaxially stretched multilayered film (I) is accomplished with a rotating roll in contact with a roll partly immersed in the coating composition contained in a tank.

Self-Adhesive Layer (III)

Although various self-adhesives may be used for forming the self-adhesive layer, the following pressure-sensitive adhesives are preferred.

(a) Pressure-Sensitive Adhesive

Preferred pressure-sensitive adhesives include rubber adhesives comprising polyisobutylene rubber, butyl rubber, or a mixture thereof dissolved in an organic solvent such as benzene, toluene, xylene, or hexane; adhesives obtained by incorporating into these rubber adhesives a tackifier such as rosin abietate, a terpene/phenol copolymer, or a terpene/indene copolymer; and acrylic adhesives comprising an acrylic copolymer having a glass transition point of −20° C. or lower, such as a 2-ethylhexyl acrylate/n-butyl acrylate copolymer or a 2-ethylhexyl acrylate/ethyl acrylate/methyl methacrylate terpolymer, dissolved in an organic solvent.

The pressure-sensitive adhesive is applied in an amount of from 3 to 40 g/m$^2$, preferably from 10 to 30 g/m$^2$, in a solid basis.

The thus-formed pressure-sensitive adhesive layer generally has a dry thickness of from 10 to 50 μm in the case of acrylic adhesives or from 80 to 150 μm in the case of rubber adhesives.

(b) Anchor Coating Agent

An anchor coating agent is preferably applied prior to the application of the pressure-sensitive adhesive.

Examples of the anchor coating agent include polyurethanes, polyisocyanate/polyether polyols, polyisocyanate/polyester polyols, polyethyleneimine, and alkyl titanates. These compounds are generally used as a solution in an organic solvent, e.g., methanol, ethyl acetate, toluene, or hexane, or in water.

The anchor coating agent is applied to the substrate (I) in an amount of from 0.01 to 5 g/m$^2$, preferably from 0.05 to 2 g/m$^2$, in terms of solid amount after drying.

Release Paper Layer

Release paper layer (IV) is composed of paper coated on the back side with a resin release layer. The resin release layer can be formed by directly coating the paper with a solution of a release resin such as a silicone resin or polyethylene wax in, e.g., any of the aforementioned organic solvents, followed by drying.

The releasing resin is applied in an amount of from 0.5 to 10 g/m$^2$, preferably from 1 to 8 g/m$^2$, in terms of solid amount after drying.

Management with Bar Code (1) Formation of Bar Code

Figure 2:
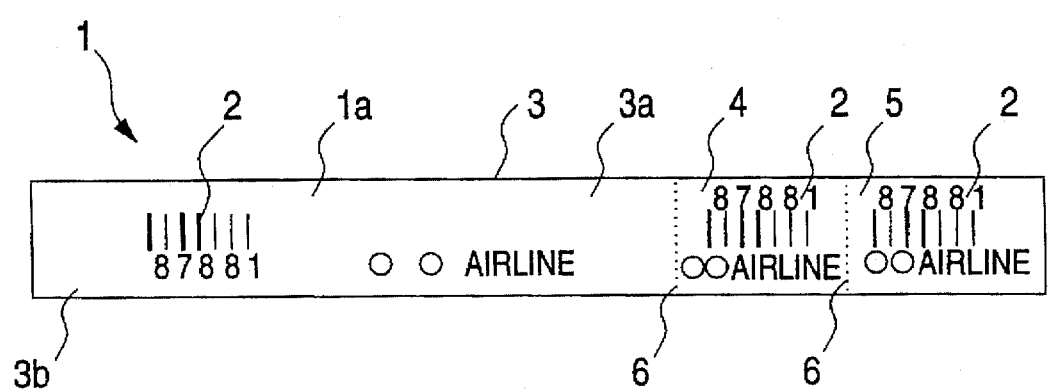
FIG. 2 is a plan view of an air baggage tag according to the present invention.

As shown in FIG. 2, a bar code 2 or other information can be printed on the front surface of the above-described recording layer (II) by means of a printer, etc., under computer control.

If desired, other information, such as an airline name, may be also printed by various printing methods, such as gravure printing, offset printing, flexographic printing, and screen printing.

(2) Attachment of Air Baggage Tag

Baggage management using the air baggage tag 1 of the present invention is conducted, for example, as follows.

Figure 3:
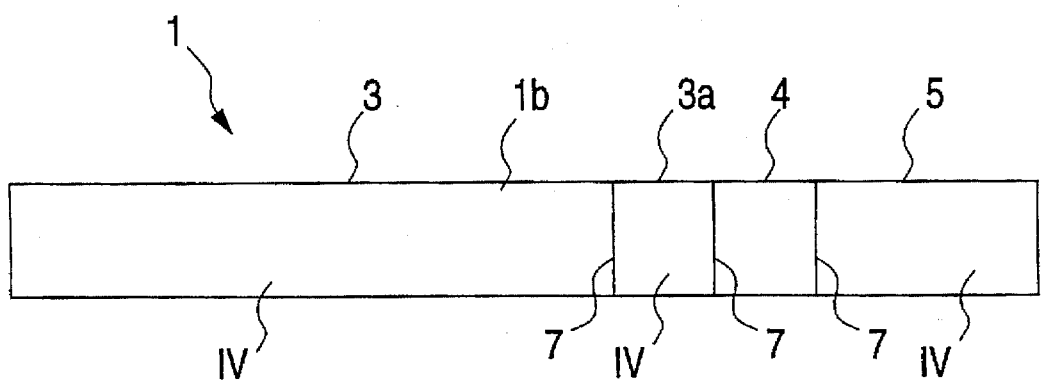
FIG. 3 illustrates the back side of the air baggage tag shown in FIG. 2.

The front surface 1a of the air baggage tag 1 has a structure as shown in FIG. 2, and the back surface 1b thereof has a structure as shown in FIG. 3. This air baggage tag 1 is composed of three parts: a baggage tag 3 to be attached to a piece of baggage, a trace tag 4 to be kept by an airline, and a claim tag 5 to be kept by a passenger. For easy separation into these parts, the tag 1 has perforations 6 piercing through recording layer (II), substrate layer (I), and self-adhesive layer (III), and cuts 7 have been formed in release paper layer (IV).

Figure 4:
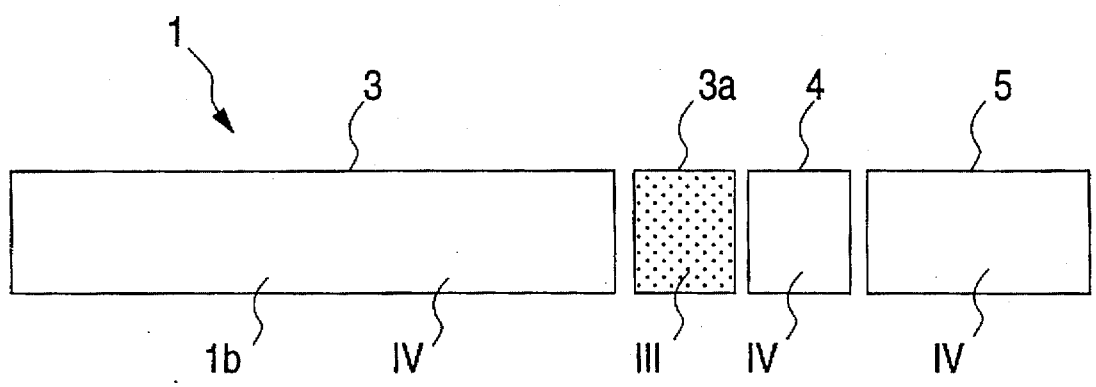
FIG. 4 illustrates the back side of the air baggage tag shown in FIG. 2 which has been divided into a baggage tag, a trace tag, and a claim tag, with the release paper of the baggage tag being released from the back side to expose the self-adhesive layer and yield an adhesive layer.
Figure 5:
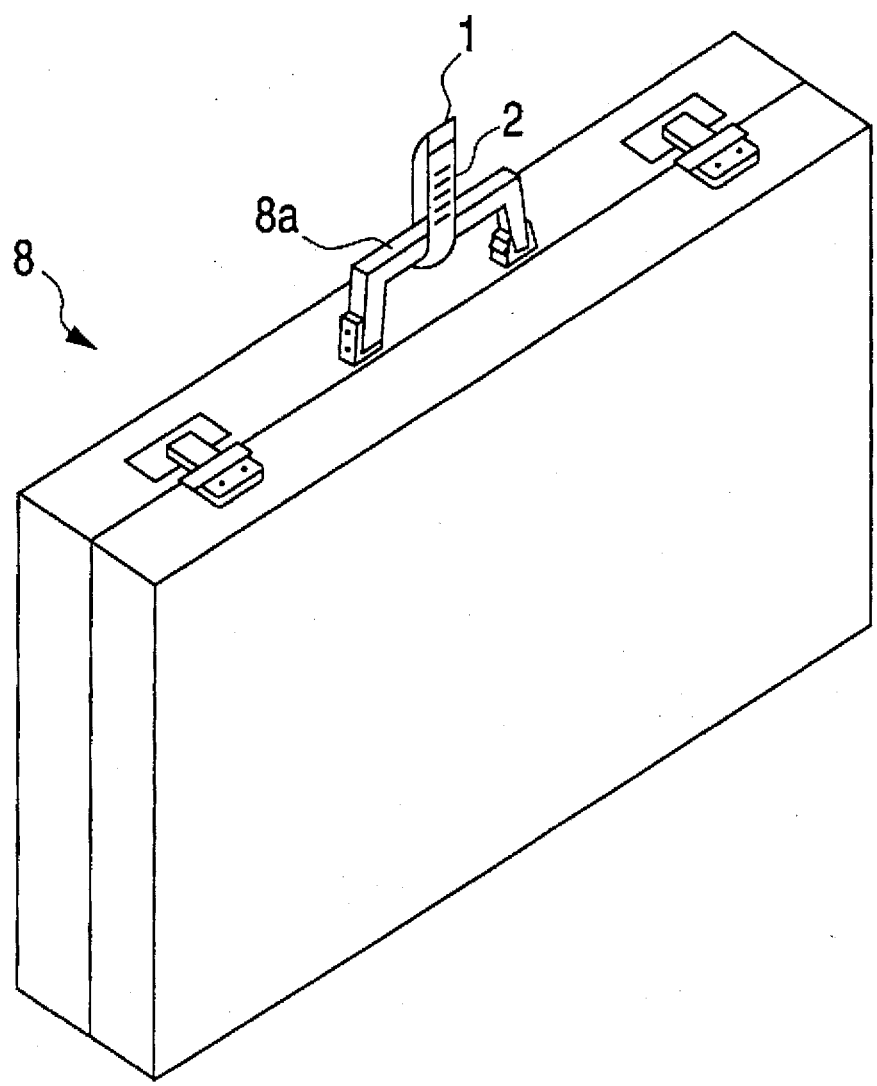
FIG. 5 illustrates an air baggage tag attached to a baggage.

When a passenger checks his baggage, the airline separates the air baggage tag 1 into the three parts. The claim tag 5 to be kept by a passenger is handed to the passenger. The release layer (IV) of the baggage tag 3 which layer covers an adhesive area 3a formed at one end of the back surface of the tag 3 is stripped off to expose part of the underlying self-adhesive layer (III) as illustrated in FIG. 4. The baggage tag 3 is then put through, e.g., a handle 8a of a trunk 8, before the exposed self-adhesive layer (III) in the adhesive area 3a is stuck to the other end 3b of the front surface of the baggage tag 3 to form a loop, as shown in FIG. 5.

The trace tag 4 is kept by the airline for baggage management.

In some cases, baggage service is controlled by computer management of bar codes. In such cases, the trace tag 4 to be kept by an airline is unnecessary and may be omitted.

The uniaxially stretched multilayered film of the present invention and the air baggage tag containing the same as a substrate layer will be illustrated below in detail by reference to Examples thereof and Comparative Examples. Unless otherwise indicated, all parts, percents, ratios and the like are by weight.

[1] Evaluation Methods

In the Examples and Comparative Examples, physical properties were evaluated by the following methods.

Air Baggage Tag

Tear Strength

Measured in accordance with ASTM D-1922-61T with an Elmendorf tear strength tester manufactured by Toyo Seiki K.K.

Tearing Test

An air baggage tag was notched on one side in the machine direction and on one side in the transverse direction, and was then torn by hand. The tear resistance was evaluated from the feel to the hand and the way of tearing, and judged according to the following four ratings.

⊚: very strong

○: strong

Δ: weak (not acceptable for practical use)

x: very weak

Printing Test (1) Heat-Sensitive Recording

The heat-sensitive recording layer of an air baggage tag was printed by means of a thermal printer manufactured by Ohkura Denki K.K. (dot density: 8 dots/mm, printing power: 0.19 W/dot) at varied printing pulse widths. The gradation of the resulting print was visually examined and judged.

⊚: very good

○: good

Δ: not acceptable for practical use x: poor (2) Heat Transfer Recording

The heat transfer image-receiving layer of an air baggage tag was printed by means of a thermal printer manufactured by Ohkura Denki K.K. (dot density: 6 dots/mm, printing power: 0.23 W/dot) at varied printing pulse widths. The gradation of the resulting print was visually examined and judged.

⊚: very good

○: good

Δ: not acceptable for practical use x: poor (3) Laser Printing

The laser-printable recording layer of an air baggage tag was printed with a toner by means of the dry type non-impact printer SPS-X (trade name), manufactured by Showa Joho K.K. The resulting print was visually judged for readability.

⊚: very good o: good

Δ: not acceptable for practical use x: poor (4) Adhesion of Recording Layer (II)

Pressure-sensitive adhesive tape "Cello Tape" (trade name), manufactured by Nichiban Co., Ltd., was adhered tenaciously to recording layer (II) and then stripped from the recording layer (II). The degree of the resulting peeling of the recording layer from substrate layer (a) was visually judged.

Percentage of Residual Recording Layer

100–95% good (o)

94–80% slightly poor (Δ)

79–0% poor (x)

Uniaxially Stretched Multilayered Film
Offset Printability

Using the offset printing ink "TSP-400" (trade name), manufactured by Toyo Ink Mfg. Co., Ltd., and a four-color offset press manufactured by Komori Insatsuki K.K., the front surface of a uniaxially stretched multilayered film (synthetic paper) was subjected to lithographic offset printing in four colors (black, blue, red, and yellow) to evaluate ink transferability and ink adhesion by the following methods.

(1) Ink Transferability

A halftone area for each color was viewed with a magnifying glass (30 diameters) to visually judge dot reproducibility.

Dot Reproducibility

100–75% good (o)

74–50% slightly poor (Δ)

49–0% poor (x)

(2) Ink Adhesion

Pressure-sensitive adhesive tape "Cello Tape" (trade name), manufactured by Nichiban Co., Ltd., was adhered tenaciously to a printed area and then stripped from the print surface. The degree of the resulting peeling of the ink from the synthetic paper was visually judged.

Percentage of Residual Ink

100–95% good (o)

94–80% slightly poor (Δ)

79–0% (x)

(3) Pencil Writability

A uniaxially stretched multilayered film was subjected to writing with a pencil 9800 "HB", manufactured by Mitsubishi Enpitsu K.K., to examine the possibility of writing.

o: possible x: impossible

EXAMPLE 1

Production of Substrate Layer (I)

(i) One hundred parts by weight of a resin blend consisting of 75 wt % propylene homopolymer having a melt flow rate (MFR) of 0.8 g/10 min, a degree of crystallinity of 67%, and a melting point of 167° C. and 25 wt % low-density polyethylene having a melting point of 111° C. and a density of 0.910 g/cm$^3$ was mixed with 25 parts by weight of calcium carbonate having an average particle diameter of 1.5 μm. The resulting composition (A) was melt-kneaded in an extruder set at 250° C. to prepare a composition for base layer (A).

(ii) A composition (B) consisting of 50 wt % propylene homopolymer having an MFR of 4 g/10 min, a degree of crystallinity of 64%, and a melting point of 167° C., 45 wt % calcium carbonate having an average particle diameter of 1.5 μm, and 5 wt % titanium oxide having an average particle diameter of 0.8 μm was melt-kneaded in another extruder set at 250° C. This molten composition (B) was fed to a co-extrusion die along with the above-obtained composition for base layer (A) and co-extruded into a sheet form so that the composition (B) was laminated to both sides of the composition (A) within the die. The resulting extrudate was cooled to 60° C. with cooling rolls to obtain an unstretched sheet having a three-layer structure (c'/a'/c').

This unstretched three-layered sheet was stretched 5 times in the machine direction with a longitudinal stretching machine set at 135° C. and comprising rolls having different circumferential speeds, and then annealed at 150° C. After cooling to 50° C., the stretched sheet was trimmed to obtain a synthetic paper consisting of a uniaxially stretched three-layered film (B/A/B) for use as substrate layer (I) which had a thickness of 80 μm (c/a/c=5/70/5 μm) and contained fine closed voids.

This synthetic paper had a void volume of 30% and an opacity as measured in accordance with JIS P-8138 of 90%. The synthetic paper obtained had Elmendorf tear strengths of 25 g as measured in the stretching direction (machine direction) and of 250 g as measured in a direction perpendicular to the stretching direction (in the transverse direction).

(iii) Production of Base Layer of Air Baggage Tag (V)

An acrylic pressure-sensitive adhesive "Olivine BPS-1109" (Trade name of Toyo Ink Manufacturing Industry) (III) was applied on the "back" side of the substrate (I) in an amount of 25 g/m$^2$ on a solid basis.

A release paper "KS-11S" (Trade name of Lintee Corporation) (IV) (60 μm thick) was superposed on the resulting adhesive layer (III) to obtain a base layer.

(iv) Formation of Heat-Sensitive Recording Layer

The coating composition for the heat-sensitive recording layer shown below was applied on the "front" side of the substrate (I) of the above-obtained base layer by the method given below. Thus, a heat-sensitive recording layer (II) was formed.

A bar code as shown in FIG. 2 was printed on the heat-sensitive recording layer (II) of the resulting tag, and the print was evaluated. The results obtained are shown in Table 1.

Further, this air baggage tag was attached to the handle of a trunk as shown in FIG. 5.

| Preparation of Coating Composition for Heat-Sensitive Recording layer | |
|---|---|
| | by weight |
| (i) Preparation of Solution A | |
| 3-(N-Ethyl-N-isoamylamino)-6-methyl-7-phenylaminofluoran | 10 parts |
| Dibenzyl terephthalate | 20 parts |
| Methyl cellulose, 5% by weight of aq. solution | 20 parts |
| Water | 40 parts |
| (ii) Preparation of Solution B | |

Preparation of Coating Composition for Heat-Sensitive Recording layer

|  | by weight |
|---|---|
| 4,4-Isopropylidenediphenol | 30 parts |
| Methyl cellulose, 5% by weight of aq. solution | 40 parts |
| Water | 20 parts |

The above ingredients were mixed and ground with a sand mill to an average particle diameter of 3 μm.

The above ingredients were mixed and ground with a sand mill to an average particle diameter of 3 μm.

(iii) Preparation of Coating Composition

Ninety parts of solution A was mixed with 90 parts of solution B, 30 parts of a silicon oxide pigment (trade name, "Mizucasil P-527," manufactured by Mizusawa Kagaku K.K,; average particle diameter: 1.8 μm; oil absorption: 180 cc/100 g), 300 parts of a 10% aqueous solution of polyvinyl alcohol, and 28 parts of water. This mixture was stirred to prepare a coating composition.

Application Method

An aqueous coating composition comprising a polyethyleneimine-based anchor coating agent and silica for anti-blocking was applied to the surface layer of the substrate (I) to form an anchor coat layer. The above-prepared coating composition (iii) for the heat-sensitive recording layer was applied thereto in an amount of 5 g/m² on a dry basis. The coating was dried and then super calendered to obtain an air baggage tag of the heat-sensitive recording type.

EXAMPLE 2

An air baggage tag was obtained in the same manner as in Example 1, except that the following coating composition for forming a heat transfer image-receiving layer was applied on the "front" side of the substrate (I) of the base layer obtained in "(iii) Production of Base Layer" in Example 1.

A bar code as shown in FIG. 2 was printed on the thus-obtained air baggage tag of the heat transfer image-receiving type using a heat transfer sheet, and the print was evaluated. The results obtained are shown in Table 1.

Preparation of Coating Composition for Heat Transfer Image-Receiving Layer

| Vylon 200 (trade mark; saturated polyester manufactured by Toyobo Co., Ltd.; TK = 67° C.) | 5.3 parts |
|---|---|
| Vylon 290 (trade mark; saturated polyester manufactured by Toyobo Co., Ltd.; TK = 77° C.) | 5.3 parts |
| Vinylite VYHH (trade mark; vinyl chloride copolymer manufactured by Union Carbide) | 4.5 parts |
| Titanium oxide (trade mark; KA-10, manufactured by Titan Kogyo K.K.) | 1.5 parts |
| KF-393 (trade mark; amino-modified silicone oil manufactured by Shin-Etsu Silicone Co., Ltd.) | 1.1 part |
| X-22-343 (trade mark; epoxy-modified silicone oil manufactured by Shin-Etsu Silicone Co., Ltd.) | 1.1 part |
| Toluene | 30 parts |
| Methyl ethyl ketone | 30 parts |
| Cyclohexanone | 22 parts |

The above ingredients were mixed to prepare a coating composition for image-receiving layer formation. This coating composition was applied by wire bar coating in such an amount as to result in dry thickness of 4 μm, and dried to form an air baggage tag of the heat transfer image-receiving type.

EXAMPLE 3

The same procedure as in Example 1 was carried out, except that the following coating composition for forming a laser printing recording layer was applied on the "front" side of the substrate (I) of the base layer obtained in "(iii) Production of Base Layer" in Example 1. Thus, an air baggage tag of the non-impact printing type was obtained.

A bar code as shown in FIG. 2 was printed on the thus-obtained air baggage tag of the non-impact printing type with a laser printer, and the print was evaluated. The results obtained are shown in Table 1.

Preparation of Coating Composition for Laser Printing Recording Layer

Into a three-necked flask equipped with a stirrer, a reflux condenser, and a thermometer were introduced 15 parts of 2-hydroxyethyl methacrylate, 50 parts of methyl methacrylate, 35 parts of ethyl acrylate, and 100 parts of toluene. After the atmosphere within the flask was replaced with nitrogen, 0.6 parts of 2,2-azobisisobutyronitrile was introduced as an initiator to conduct polymerization at 80° C. for 4 hours.

As a result, a 50% toluene solution of a hydroxylated methacrylic ester polymer having a hydroxyl number of 65 was obtained.

To this toluene solution were then added a 75% ethyl acetate solution of "Coronate HL" (hexamethylene isocyanate compound manufactured by Nippon Polyurethane Co., Ltd.) and a heavy calcium carbonate powder having an average particle diameter of 1.5 μm, in the solids proportions shown in Table 1. The solids content of the resulting composition was adjusted to 40% with butyl acetate. This composition was applied to the "front" side of the synthetic paper in an amount of 3 g/m² on a dry basis, and then cured at 80° C. with hot air for 1 hour to obtain an air baggage tag of the non-impact printing type.

EXAMPLE 4

An unstretched sheet having a three-layer structure was produced in the same manner as in the production of a uniaxially stretched multilayered film in Example 1, except for the changes below. The composition for forming a base layer (A) was replaced with a composition (A) obtained by incorporating 25 parts by weight of calcium carbonate having an average particle diameter of 1.5 μm into 100 parts by weight of a resin blend consisting of 75 wt % high density polyethylene having a melting point of 134° C. and a density of 0.960 g/cm³ a melt index of 4 g/10 min, and a degree of crystallinity of 56% as crystalline polyolefin (a) and 25 wt % ethylene/methyl acrylate copolymer having a melting point of 90° C. as resin (b), and the composition (B) for surface layer formation was modified by replacing the propylene homopolymer as crystalline polyolefin (e) with a high density polyethylene having a melting point of 134° C. and a density of 0.960 g/cm³.

This unstretched sheet was stretched 5 times at 135° C. and then annealed at 150° C. After cooling to 50° C., the sheet was trimmed to obtain a synthetic paper consisting of a uniaxially stretched three-layered film having a thickness of 90 μm (B/A/B thicknesses; 5 μm/80 μm/5 μm) which contained fine closed voids.

This synthetic paper had a void volume of 25% and an opacity of 92%. The measured values of tear strength are shown in Table 1.

An air baggage tag was obtained in the same manner as in Example 1, except that the thus-obtained synthetic paper was used as substrate (I). A bar code as shown in FIG. 2 was then printed thereon, and the print was evaluated. The results obtained are shown in Table 1.

EXAMPLE 5

An unstretched sheet having a B/A/B structure was produced in the same manner as in the production of a uniaxially stretched multilayered film (I) in Example 1, except for the changes below. The composition for forming a base layer (A) was replaced with a composition (A) obtained by incorporating 25 parts by weight of calcium carbonate having an average particle diameter of 1.5 μm into 100 parts by weight of a resin blend consisting of 87 wt % linear low density polyethylene having a melting point of 128° C., a density of 0.914 g/cm³ and a degree of crystallinity of 40% as crystalline polyolefin (a) and 23 wt % ethylene/vinyl acetate copolymer having a melting point of 80° C. as resin (b), and the composition for use on both sides of the base layer was replaced with a composition (B) consisting of 50 wt % linear low density polyethylene having a degree of crystallinity of 40%, a density of 0.914 g/cm³ and a melting point of 128° C. as crystalline polyolefin (e), 40 wt % calcined clay having an average particle diameter of 1.2 μm, and 10 wt % diatomaceous earth (trade name, Celite; average particle diameter, 2.5 μm).

This unsaturated sheet was stretched 5 times in the machine direction with a longitudinal stretching machine set at 100° C., and then annealed at 120° C. After cooling to 50° C., the stretched sheet was trimmed to obtain a synthetic paper consisting of a uniaxially stretched three layered film for use as substrate layer (I) which had a thickness of 80 μm (B/A/B=5 μm/70 μm/5 μm) and contained many fine closed voids. This synthetic paper had a void volume of 20% and an opacity of 88%. The measured values of the tear strength thereof are shown in Table 1.

An air baggage tag was obtained in the same manner as in Example 1, except that the thus-obtained synthetic paper was used as substrate (I). A bar code as shown in FIG. 2 was then printed thereon, and the print was evaluated. The results obtained are shown in Table 1.

Comparative Example 1

An air baggage tag was obtained in the same manner as in Example 1, except that an 80-μm, biaxially stretched single-layered thermoplastic resin film containing fine voids and produced by the following method was used as substrate (I).

A bar code as shown in FIG. 2 was then printed on the tag, and the print was evaluated. The results obtained are shown in Table 1.

Production of Substrate Layer (I)

A composition (a) consisting of 70 wt % polypropylene having a melt flow rate (MFR) of 0.8 g/10 min, a crystallinity of 64% and a melting point of 167° C., 10 wt % high density polyethylene having a melting point of 134° C. and a density of 0.960 g/cm³, and 20 wt % calcium carbonate having an average particle diameter of 1.5 μm was melt-kneaded in an extruder set at 270° C. and extruded into a sheet form through a die. The extrudate was cooled in a cooling apparatus to obtain an unstretched sheet.

This unstretched sheet was heated to 150° C. and stretched 5 times in the machine direction to obtain a 5-fold stretched sheet.

The stretched sheet was then heated to 162° C., stretched 7.5 times in the transverse direction by means of a tenter at 162° C., and then annealed at 167° C. After cooling to 60° C., the stretched sheet was trimmed to obtain an 80 μm, biaxially stretched thermoplastic resin film containing fine voids. This film had a void volume of 38%. The measured values of tear strength are shown in Table 1.

Comparative Example 2

An air baggage tag was obtained in the same manner as in Comparative Example 1, except that a fine void-containing biaxially stretched thermoplastic resin film produced by the following method was used as a substrate in place of the fine void-containing biaxially stretched thermoplastic resin film used in Comparative Example 1.

A bar code as shown in FIG. 2 was then printed on the tag, and the print was evaluated. The results obtained are shown in Table 1.

Production of Substrate

A composition (B) consisting of 80 wt % polypropylene having an MFR of 0.8 g/10 min and a melting point of 167° C. and 20 wt % calcium carbonate having an average particle diameter of 1.5 μm and a composition (A) consisting of 95 wt % polypropylene having an FLFR of 0.8 g/10 min and 5 wt % heavy calcium carbonate having an average particle diameter of 1.5 μm were separately melt-kneaded in different extruders set at 270° C. The resulting melts were fed to the same co-extrusion die, laminated in the molten state within the die so as to result in a layer constitution of B/A/B, and extruded at 270° C. The extrudate was cooled to about 60° C. with cooling rolls.

The resulting laminate was heated to 150° C. and stretched 5 times in the machine direction. This laminate was heated to 162° C., stretched 7.5 times in the transverse direction by means of a tenter at 162° C., and then annealed at 167° C. After cooling to 60° C., the laminate was trimmed to obtain a biaxially stretched thermoplastic resin film (A) which had a three-layer structure with a thickness of 80 μm (B/A/B=5 μm/70 μm/5 μm) and which contained fine voids. This film had a void volume of 40%. The measured values of tear strength are shown in Table 1.

Comparative Example 3

A uniaxially stretched film having a three-layer structure with a thickness of 80 μm (B/A/B=5/70/5 μm) was obtained in the same manner as in Example 1, except that the composition for forming a base layer (A) was replaced with a composition (A) consisting of 90 wt % propylene homopolymer (a) having a melting point of 167° C., a degree of crystallinity of 67%, and an MFR of 0.5 g/10 min and 10 wt % low-density polyethylene (b) having a melting point of 111° C., and that the composition for forming surface layers (B) was replaced with the propylene homopolymer alone.

This laminated film had a void volume of 0% and an opacity of 3%. The measured values of tear strength are shown in Table 1.

An air baggage tag was obtained in the same manner as in Example 1, except that the thus-obtained uniaxially stretched multilayered film was used as substrate (I).

A bar code as shown in FIG. 2 was then printed thereon, and the print was evaluated. The results obtained are shown in Table 1.

Comparative Example 4

An air baggage tag was obtained in the same manner as in Example 1, except that as substrate (I), use was made of synthetic paper "Yupo FPG 95" (trade name; manufactured by Oji-Yuka Synthetic Paper Co., Ltd.; thickness, 95 μm), which is a stretched laminated polypropylene film (composed of a uniaxially stretched layer/a biaxially stretched layer/a uniaxially stretched layer) containing a fine inorganic powder and having a void volume of about 33%. This tag was subjected to printing tests.

The results obtained are shown in Table 1.

TABLE 1

|  | Example 1 | Example 2 | Example 3 | Example 4 | Example 5 |
|---|---|---|---|---|---|
| Substrate layer (I) | | | | | |
| Composition wt % | | | | | |
| Base layer (A) | | | | | |
| Fine inorganic powder | Calcium carbonate, 20% | | | Calcium carbonate, 20% | Calcium carbonate, 20% |
| Crystalline polyolefin (a) | Propylene homopolymer, 60% (melting point 167° C.) | | | HDPE, 60% (melting point, 134° C.) | L-LDPE, 70% (melting point, 128° C.) |
| Thermoplastic resin (b) | LDPE, 20% (melting point, 111° C.) | | | EMA, 20% (melting point, 90° C.) | EVA, 10% (melting point, 80° C.) |
| Surface layer (B) | | | | | |
| Fine inorganic powder (i) | Calcium carbonate, 45% | | | Calcium carbonate, 45% | Calcined clay, 40% |
| Fine inorganic powder (ii) | Titanium oxide, 5% | | | Titanium oxide, 5% | Diatomaceous earth, 10% |
| Crystalline polyolefin (e) | Propylene homopolymer, 50% (melting point, 167° C.) | | | HDPE, 50% (melting point, 134° C.) | L-LDPE, 50% (melting point, 128° C.) |
| Evaluation of Synthetic Paper | | | | | |
| Axis of stretching | Uniaxial, multilayered | | | Uniaxial, multilayered | Uniaxial, multilayered |
| Properties | | | | | |
| Thickness (surface/base/surface) | (5 μm/70 μm/5 μm) | | | (5/80/5 μm) | (5/70/5 μm) |
| Void volume (%) | 30 | | | 25 | 20 |
| Tear strength (Elmendorf) | | | | | |
| Stretching (machine) direction (g) | 25 | | | 35 | 35 |
| Perpendicular (transverse) direction (g) | 250 | | | 180 | 160 |
| Offset printability | | | | | |
| Ink transferability | o | | | o | o |
| Ink adhesion | o | | | o | o |
| Pencil writability | o | | | o | o |
| Air Baggage Tag | | | | | |
| Recording layer (II) | Heat-sensitive | Heat transfer | Laser printing | Heat-sensitive | Heat-sensitive |
| Adhesion of recording layer | o | o | o | o | o |
| Tearing test | ⊙ | ⊙ | — | ⊙ | ⊙ |
| Printing test | o | o | o | o | o |

|  | Comparative Example 1 | Comparative Example 2 | Comparative Example 3 | Comparative Example 4 |
|---|---|---|---|---|
| Substrate layer (I) | | | | |
| Composition wt % | | | | |
| Base layer (A) | | | | YUPO FPG 95 |
| Fine inorganic powder | Calcium carbonate, 20% | Calcium carbonate, 20% | — | |
| Crystalline polyolefin (a) | Polypropylene, 70% (melting point, 167° C.) | Polypropylene, 80% (melting point, 167° C.) | Polypropylene, 90% (melting point, 167° C.) | |
| Thermoplastic resin (b) | HDPE, 10% (melting point, 134° C.) | | LDPE, 10% (melting point, 111° C.) | |
| Surface layer (B) | | | | |
| Fine inorganic powder (i) | — | Calcium carbonate, 5% | — | |
| Fine inorganic powder (ii) | — | — | | |
| Crystalline polyolefin (e) | — | Polypropylene, 95% (melting point, 167° C.) | Polypropylene, 100% (melting point, 167%) | |
| Evaluation of Synthetic Paper | | | | |
| Axis of stretching | Biaxial, multilayered | Biaxial, multilayered | Uniaxial, multilayered | Uniaxial/biaxial/uniaxial |
| Properties | | | | |
| Thickness (surface/base/surface) | (—/80/— μm) | (5/70/5 μm) | (5/70/5 μm) | (22/50/23) |
| Void volume (%) | 38 | 40 | 0 | 31 |

TABLE 1-continued

| | | | | |
|---|---|---|---|---|
| Tear strength (Elmendorf) | | | | |
| Stretching (machine) direction (g) | 60 | 65 | 25 | 35 |
| Perpendicular (transverse) direction (g) | 45 | 50 | 300 | 21 |
| Offset printability | | | | |
| Ink transferability | o | o | x | o |
| Ink adhesion | o | o | x | o |
| Pencil writability | o | o | x | o |
| Air Baggage Tag | | | | |
| Recording layer (II) | Heat-sensitive | Heat-sensitive | Heat-sensitive | Heat-sensitive |
| Adhesion of recording layer | Δ | x | x | o |
| Tearing test | x | x | Δ | x |
| Printing test | o | o | x | o |

LDPE = low-density polyethylene (m.p. 111° C.),
EMA = ethylene/methyl acrylate copolymer (m.p. 90° C.)
HDPE = high-density polyethylene (m.p. 134° C.),
EVA = ethylene/vinyl acetate copolymer (m.p. 80° C.)
L-LDPE = linear low-density polyethylene (m.p. 128° C.)

The uniaxially stretched multilayered film of the present invention is excellent in printability and pencil writability. Further, the air baggage tag containing the film as a substrate layer is excellent in printability and tear resistance.

While the invention has been described in detail and with reference to specific examples thereof, it will be apparent to one skilled in the art that various changes and modifications can be made therein without departing from the spirit and scope thereof.

What is claimed is:

1. A uniaxially stretched multilayered film obtained by uniaxially stretching a laminated film at a stretch ratio of from 3 to 10, said laminated film consisting essentially of a base layer (A) made of a resin composition comprising resinous ingredients comprising from 50 to 90% by weight crystalline polyolefin (a) and from 50 to 10% by weight thermoplastic resin (b) having a lower melting point than the crystalline polyolefin (a) and an inorganic fine powder (c) in an amount of from 0 to 35% by weight based on the sum of the weight of the resinous ingredients and, formed on at least one side of said base layer (A), a surface layer (B) made of a resin composition comprising from 20 to 80% by weight inorganic fine powder (d) and from 80 to 20% by weight crystalline polyolefin (e), said uniaxially stretching being conducted at a temperature lower than the melting point of said crystalline polyolefin (a) and lower than the melting point of said crystalline polyolefin (e) but at a temperature higher than the melting point of said thermoplastic resin (b).

2. The uniaxially stretched multilayered film as claimed in claim 1, wherein said crystalline polyolefins (a) and (e) each is a propylene homopolymer having a melting point of from 160° to 180° C. and a melt flow rate of from 0.5 to 20 g/10 min, and said thermoplastic resin (b) is low density polyethylene having a melting point of from 80° to 125° C.

3. The uniaxially stretched multilayered film as claimed in claim 1, which has a void volume of from 10 to 60%.

4. The uniaxially stretched multilayered film as claimed in claim 3, which has Elmendorf tear strengths of from 15 to 80 g as measured in the direction of stretching and of from 100 to 600 g as measured in a direction perpendicular to the stretching direction.

5. The uniaxially stretched multilayered film as claimed in claim 1, wherein said base layer (A) has a thickness of from 20 to 300 μm and said surface layer (B) has a thickness of from 1 to 100 μm, with the total thickness of said uniaxially stretched multilayered film being from 30 to 400 μm.

6. An air baggage tag which comprises a recording layer (II) bearing a bar code, a substrate layer (I), a self-adhesive layer (III), and a release paper layer (IV) and which air baggage tag is managed by means of the bar code, said substrate layer (i) being the uniaxially stretched multi-layered film as claimed in claim 1 which has a void volume of from 10 to 60% and an Elmendorf tear strength (ASTM D-1922-61T) of from 15 to 80 g as measured in the direction of stretching and an Elmendorf tear strength of from 100 to 600 g as measured in a direction perpendicular to the stretching direction (in the transverse direction).

7. The air baggage tag as claimed in claim 6, wherein said recording layer (II) is selected from a heat-sensitive recording layer, a heat transfer image-receiving layer, and a coating layer for laser printing.

* * * * *